(12) United States Patent
Lee et al.

(10) Patent No.: US 10,820,029 B2
(45) Date of Patent: Oct. 27, 2020

(54) ALERTING GROUPS OF USER DEVICES TO SIMILAR VIDEO CONTENT OF INTEREST BASED ON ROLE

(71) Applicant: MOTOROLA SOLUTIONS, INC., Chicago, IL (US)

(72) Inventors: Kuan Heng Lee, Penang (MY); Eng Wiang Chan, Penang (MY); Peng Khoon Cheah, Penang (MY); Mern Keat Lee, Penang (MY); Kok Khian Ng, Penang (MY); Prebesh Pavithran, Penang (MY); Anil Kumar Vadlamudi, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 86 days.

(21) Appl. No.: 16/169,714

(22) Filed: Oct. 24, 2018

(65) Prior Publication Data

US 2020/0137441 A1   Apr. 30, 2020

(51) Int. Cl.
*H04N 7/10* (2006.01)
*H04N 7/025* (2006.01)
(Continued)

(52) U.S. Cl.
CPC ... *H04N 21/25891* (2013.01); *G06K 9/00711* (2013.01); *G06N 3/08* (2013.01);
(Continued)

(58) Field of Classification Search
CPC .......... H04N 21/25891; H04N 19/167; G06N 20/00; G06N 3/08; G06N 5/02; G06K 9/00711; G08B 21/10; G08B 27/001
See application file for complete search history.

(56) References Cited

U.S. PATENT DOCUMENTS

| 8,102,406 B2 | 1/2012 | Peleg et al. |
| 9,436,754 B1 | 9/2016 | Hu et al. |

(Continued)

FOREIGN PATENT DOCUMENTS

WO   2017/035541 A1   3/2017

OTHER PUBLICATIONS

Extended European Search Report dated Mar. 6, 2020 for European Application No. 19204598.7 (10 pages).

(Continued)

*Primary Examiner* — Kyu Chae
(74) *Attorney, Agent, or Firm* — Michael Best and Friedrich LLP (57) ABSTRACT

A method and apparatus for alerting groups of user devices to similar video content of interest based on role. The method includes providing a first video to groups of user devices, each having an associated user role, receiving viewing metrics indicative of levels of viewing interest for the first video from a first group of user devices associated with a particular user role, and when a level of viewing interest is above a predetermined threshold, classifying one or more corresponding first video frames of the first video as frames of interest. The method further includes receiving a second video, determining, using the frames of interest, that video content of the second video is of interest to a second group of user devices having the particular user role, and providing an alert to the second group of user devices.

20 Claims, 7 Drawing Sheets

(51) Int. Cl.
  *H04N 21/258* (2011.01)
  *H04N 19/167* (2014.01)
  *G06N 20/00* (2019.01)
  *G06K 9/00* (2006.01)
  *G06N 3/08* (2006.01)
  *G06N 5/02* (2006.01)
  *G08B 21/10* (2006.01)
  *G08B 27/00* (2006.01)

(52) U.S. Cl.
  CPC .............. *G06N 5/02* (2013.01); *G06N 20/00* (2019.01); *G08B 21/10* (2013.01); *G08B 27/001* (2013.01); *H04N 19/167* (2014.11)

(56) References Cited

U.S. PATENT DOCUMENTS

| | | | |
|---|---|---|---|
| 2011/0267544 | A1 | 11/2011 | Mei et al. |
| 2014/0072285 | A1 | 3/2014 | Shynar et al. |
| 2014/0321831 | A1 | 10/2014 | Olsen et al. |
| 2018/0165576 | A1 | 6/2018 | Latapie et al. |
| 2018/0181901 | A1* | 6/2018 | Babcock ............... H04L 67/306 |
| 2018/0248929 | A1* | 8/2018 | Han ................... H04L 65/4061 |

OTHER PUBLICATIONS

Examination Report No. 1 issued by the Australian Government for Application No. 2019250281 dated Sep. 3, 2020 (4 pages).

* cited by examiner

ALERTING GROUPS OF USER DEVICES TO SIMILAR VIDEO CONTENT OF INTEREST BASED ON ROLE

BACKGROUND OF THE INVENTION

When a public safety event occurs, the event is often captured by a video camera, audio recorder, or both. The captured video, audio, or both are sent to user devices associated with users (for example, public safety personnel or emergency response personnel) having various user roles (for example, paramedics, fire response personnel, police officers, and the like) to aid the users in responding to the public safety event.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described above, when a public safety event occurs, the event is often captured by a video camera, audio recorder, or both. A public safety event may be, for example, a fire, a terrorist attack, a bank robbery, and the like. The captured video, audio, or both are sent to user devices associated with users (for example, public safety personnel or emergency response personnel) having various user roles (for example, user roles associated with emergency response personnel such as paramedic, fire response personnel, police officer, and the like) to aid the users in responding to the public safety event. It may be the case that users with different user roles may find different video and/or audio, or different portions of a same video and/or audio, to be of interest. For example, a member of fire response personnel may find one portion of a video useful while a paramedic may find a different portion of the video useful. Therefore, it is desirable to automatically alert groups of users having a variety of user roles when a video/audio recording contains content that is of interest to the group(s) of users.

Embodiments described herein provide, among other things, a method and system for alerting groups of user devices to similar video content of interest based on roles. It should be understood that while the embodiments herein are described in terms of video, the techniques and concepts described herein may also be applied to audio alone, video alone, and multiplexed audio/video as well.

One example embodiment provides an electronic computing device including an electronic processor for alerting groups of user devices to similar video content of interest based on role. The electronic computing device is configured to provide a first video that includes first video frames to a plurality of groups of user devices, each group having an associated user role selected from a plurality of possible user roles. The electronic computing device is also configured to receive viewing metrics generated for the first video indicative of levels of viewing interest in portions of the first video from a first group of user devices associated with a particular user role and, when a level of viewing interest indicated by the viewing metrics for one or more of the user devices in the first group is above a predetermined threshold, classify one or more corresponding first video frames of the first video as one or more frames of interest. The electronic computing device is configured to perform at least one selected from the group of generate a first video summary associated with the particular user role describing contents of the one or more frames of interest and train a role-based neural network model associated with the particular user role using the one or more frames of interest. The electronic processor is further configured to receive a second video. The electronic computing device is configured to determine, by at least one selected from the group consisting of (i) matching portions of the role-based first video summary with portions of a generated second video summary describing contents of the second video and (ii) providing the second video to a machine learning software having access to the role-based neural network model and finding a match that video content of the second video is of interest to a second group of user devices having the particular user role. The electronic computing device is also configured to providing one or more of an alert, the second video, the second video summary, and a sub-sampling of the second video corresponding to portions of the second video matching at least one selected from the group consisting the first video summary and the role-based neural network model to the second group of user devices.

Figure 1:
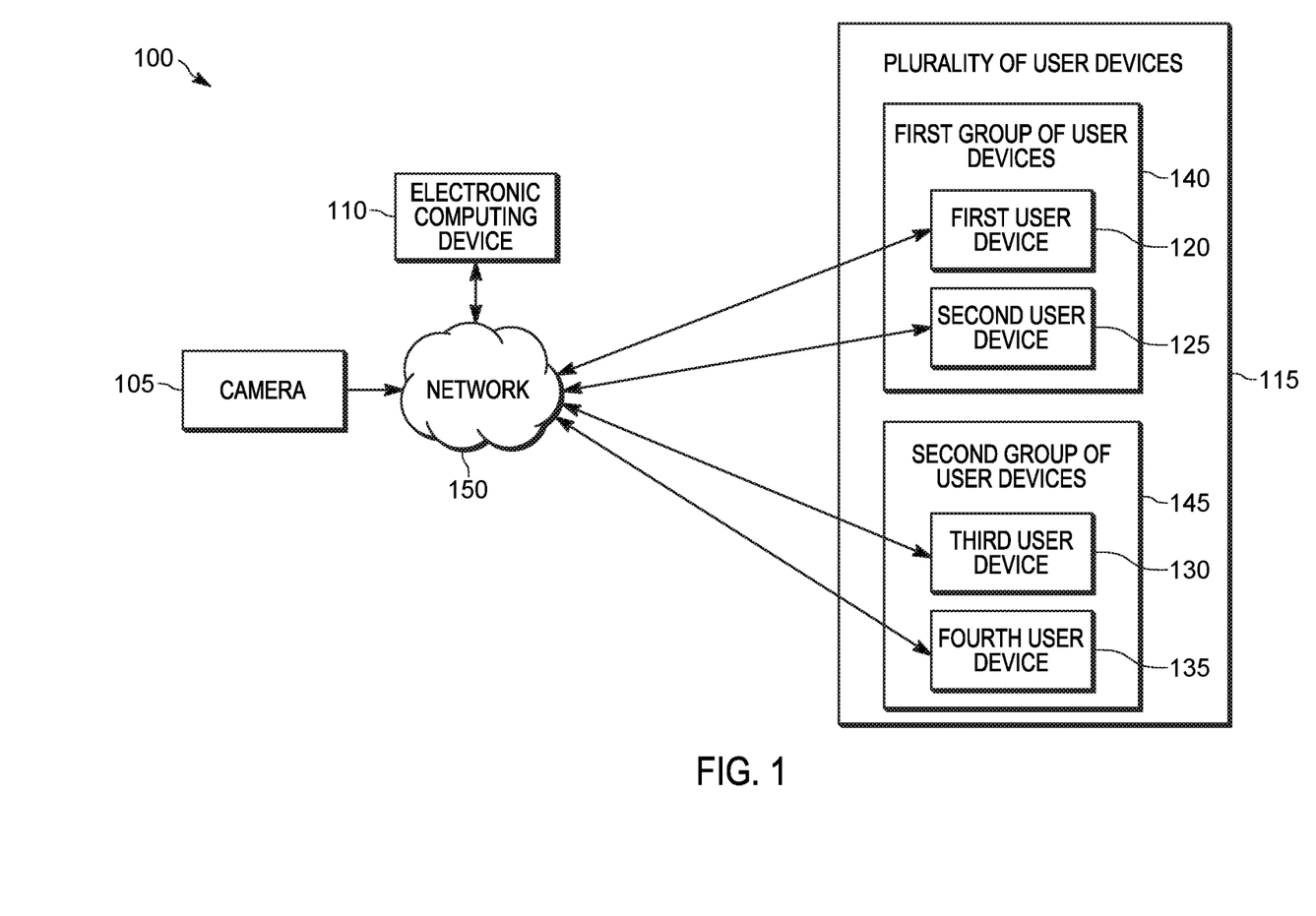
FIG. 1 is a block diagram of a system for alerting groups of user devices to similar video content of interest based on role.

FIG. 1 is a block diagram of a system 100 for alerting groups of user devices to similar video content of interest based on role. In the example shown, the system 100 includes a camera 105, an electronic computing device 110, and a plurality of user devices 115 (including a first user device 120, a second user device 125, a third user device 130, and a fourth user device 135). The plurality of user devices 115 are illustrated in FIG. 1 divided into a first group of user devices 140 (including the first user device 120 and the second user device 125), and a second group of user devices 145 (including the third user device 130 and the fourth user device 135). The camera 105, electronic computing device 110, and the plurality of user devices 115 are communicatively coupled via a network 150. The camera 105 transmits audio and video to the plurality of user devices 115 and the electronic computing device 110 via the network 150. The plurality of user devices 115 transmit viewing metrics to the electronic computing device 110 and the electronic computing device 110 is configured to transmit alerts, video, and the like to the plurality of user devices 115 via the network 150. The network 150 is an electronic communications network including wireless and wired connections. The network 150 may be implemented using a variety of one or more networks including, but not limited to, a wide area network, for example, the Internet; a local area network, for example, a Wi-Fi network, or a near-field network, for example, a Bluetooth™ network. Other types of networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used.

It should be understood that the system 100 may include a different number of groups of user devices including different numbers of user devices and that the first group of user devices 140 and the second group of user devices 145 included in FIG. 1 are purely for illustrative purposes. It should also be understood that the system 100 may include multiple input devices and that the camera 105 shown is purely for illustrative purposes. It should also be understood that the system 100 may include a different number of electronic computing devices than the number of electronic computing devices illustrated in FIG. 1 and the functionality described herein as being performed by the electronic computing device 110 may be performed by a plurality of electronic computing devices.

In the embodiment illustrated in FIG. 1 the electronic computing device 110 is, for example, a server that is configured to generate video summaries and alert user devices to content of interest. In the embodiment illustrated in FIG. 1, a user device of the plurality of user devices 115 is, for example, a mobile telephone (including smart telephones), a portable two-way radio, or a converged device including electronics, software, and other components sufficient to support both cellular and land mobile radio communications. In some embodiments, a user device is a smart watch or other smart wearable, or other type of portable electronic device configured to operate as described herein. A user device of the plurality of user devices 115 may be a mounted or stationary communication device, for example, a mobile computing device or a communication device installed in a vehicle. For example, in some embodiments, a user device of the plurality of user devices 115 may be a handheld cellular telephone carried by public safety personnel, for example, police officers. In other embodiments, a user device of the plurality of user devices 115 may be a cellular communication device installed in a public safety vehicle, for example, a police vehicle. It should be noted that each of the plurality of user devices 115 may be any one of the above mentioned options regardless of which of the above mentioned options the other user devices in the system 100 are. For example, in one embodiment the first user device 120 may be a mobile telephone while the second user device 125 may be a smart wearable. Accordingly, each user device of the plurality of user devices 115 may be any type of communication device capable of communicating over the network 150, as described herein. It should be noted that in the example embodiments described herein the first group of user devices 140 and second group of user devices 145 are each separately associated with a same user role (a particular user role) within the group. However, the system 100 may include additional groups of user devices, each associated with a same or different user role than the user role associated with the first group of user devices 140 and the second group of user devices 145. For example, one group of user devices may be associated with the user role of police officer while another group of user devices may be associated with the user role of paramedic.

Figure 2:
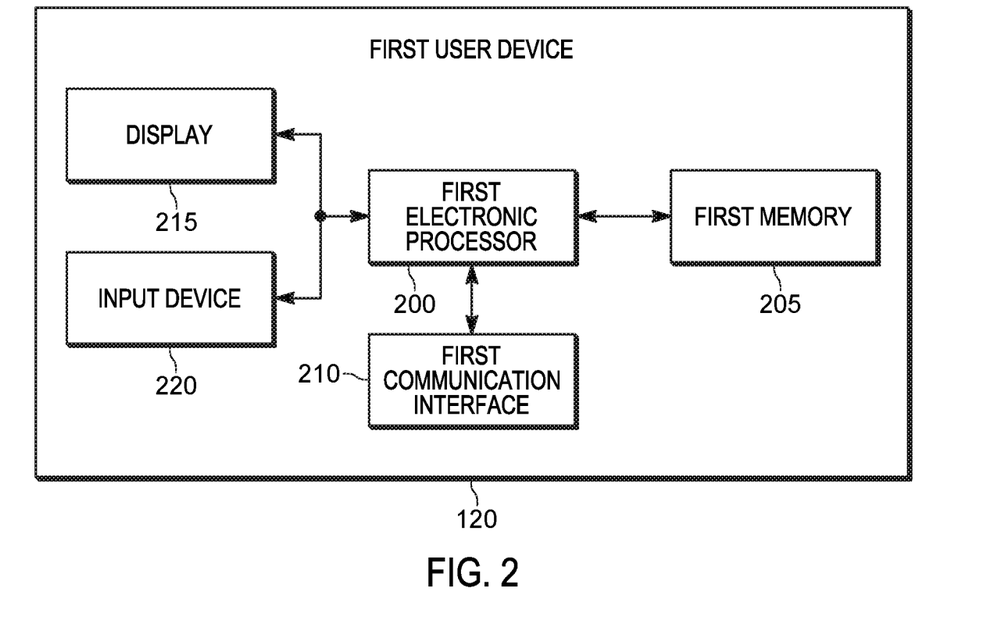
FIG. 2 is a block diagram of a user device included in the system of FIG. 1 in accordance with some embodiments.

FIG. 2 is a block diagram of the first user device 120 included in the system 100. In the example illustrated, the first user device 120 includes a first electronic processor 200 (for example, a microprocessor, application-specific integrated circuit (ASIC), or another suitable electronic device), a first memory 205 (a non-transitory, computer-readable storage medium), a first communication interface 210 (including for example a transceiver for communicating over one or more networks (for example, the network 150)), a display device 215, and an input device 220. The first memory 205 may include, for example, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or a combination of the foregoing. The first electronic processor 200, first communication interface 210, first memory 205, display device 215, and input device 220 communicate wirelessly or over one or more communication lines or buses.

The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a touchscreen (for example, as part of the display device 215), a mouse, a trackpad, a microphone, a camera, or the like. It should be understood that the first user device 120 may include more, fewer, or different components than those components illustrated in FIG. 2. For example, the first user device 120 while illustrated as having only one input device may include multiple input devices. Also, it should be understood that, although not described or illustrated herein, the second user device 125, third user device 130, and fourth user device 135 may include similar components and perform similar functionality as the first user device 120.

Figure 3:
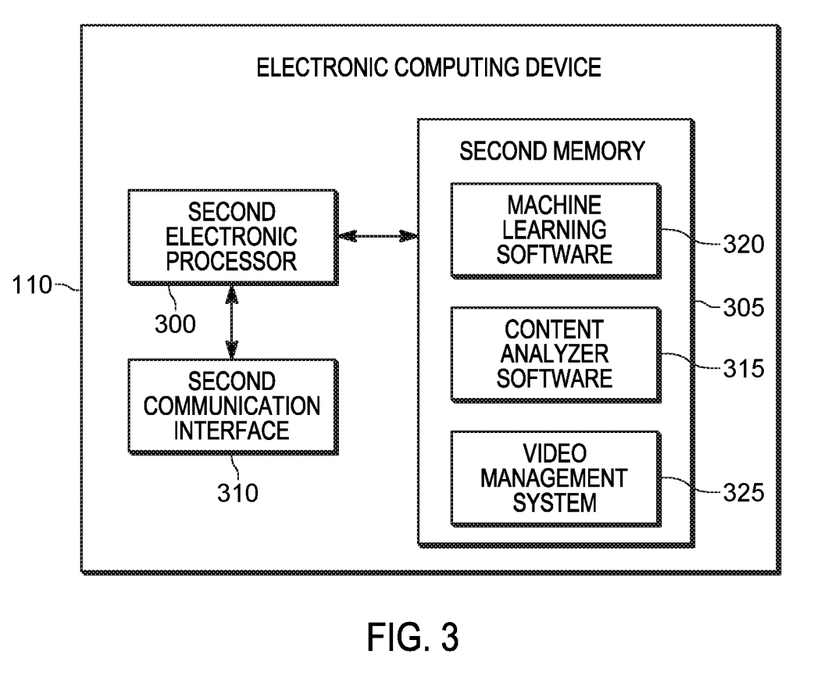
FIG. 3 is a block diagram of an electronic computing device included in the system of FIG. 1 in accordance with some embodiments.

FIG. 3 is a block diagram of the electronic computing device 110 included in the system 100 of FIG. 1. In the example illustrated, the electronic computing device 110 includes a second electronic processor 300 (for example, a microprocessor, application-specific integrated circuit (ASIC), or another suitable electronic device), a second communication interface 305 (including, for example, a transceiver for communicating over one or more networks (for example, the network 150)), and a second memory 305 (a non-transitory, computer-readable storage medium). The second memory 305 may include, for example, the types of memory described with respect to the first memory 205. The second electronic processor 300, second communication interface 310, and second memory 305 communicate wirelessly or over one or more communication lines or buses. It should be understood that the electronic computing device 110 may include more, fewer, or different components than those components illustrated in FIG. 3.

The second memory 305 includes a plurality of software components that, when executed by the second electronic processor 300, implement the functionality described below. For example, in FIG. 3 the second memory 305 is illustrated as including content analyzer software 315, machine learning software 320, and a video management system 325, although in other embodiments, the second memory 305 may contain a subset or superset of such software modules. In some embodiments, the machine learning software 320 has access to a plurality of role-based neural network models.

Figure 4:
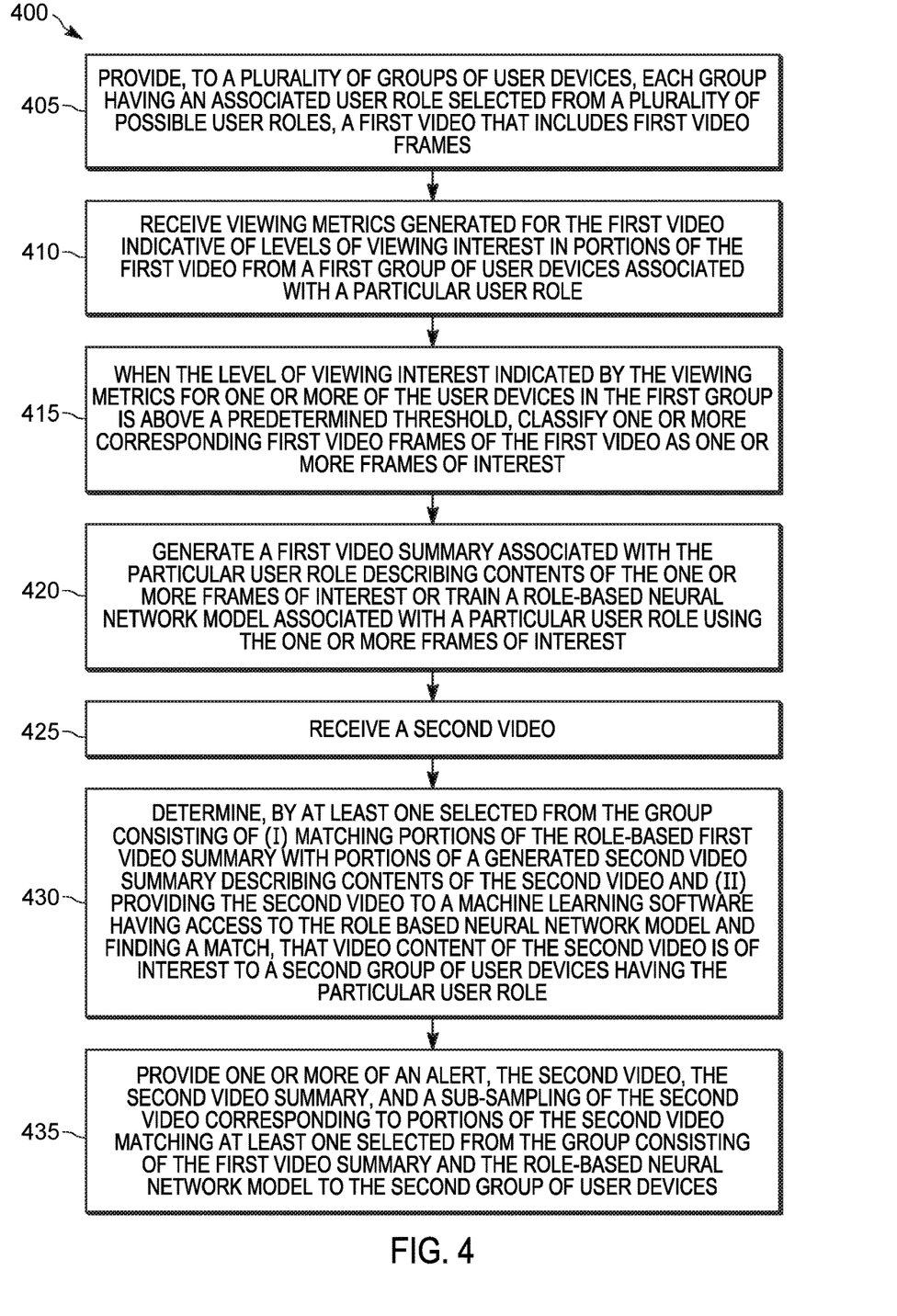
FIG. 4 is a flowchart of a method of alerting groups of user devices to similar video content of interest based on role in accordance with some embodiments.

FIG. 4 is a flowchart of a method 400 of alerting groups of user devices to similar video content of interest based on role in accordance with some embodiments. The method 400 begins at block 405 when the camera 105 provides a first video including first video frames to the plurality of user devices 115 each included in one of a plurality of groups of user devices having associated user roles selected from a plurality of possible user roles. It should be noted that, in some embodiments, the first video is streamed. In other embodiments, the first video may be recorded (for example, stored in the video management system 325) and subsequently downloaded to the plurality of user devices 115 for playback. At block 410, when a user views the first video via a display device of a user device (for example, the display device 215 of the first user device 120), the first electronic processor 200 collects, using the input device 220, a plurality of viewing metrics. The viewing metrics associated with the first video are indicative of levels of viewing interest in particular portions of the first video or in the entire first video itself.

As mentioned above, the input device 220 may include one or more input devices, each configured to receive data regarding different viewing metrics. In one example, when the input device 220 is a camera, the input device 220 may receive data regarding where on the display device 215 the user rests their gaze as the user views the first video (eye-interaction with the video frames). In another example, when the input device 220 is a touch screen, the input device 220 may receive playback metrics data or video manipulation data regarding first video frames played back, first video frames replayed, first video frames paused, first video frames zoomed into or out of, first video frames tagged, circled, or labeled, and the like. In yet another example, when the input device 220 includes a microphone, the input device 220 may be configured to receive audio from a viewing user. In another example, if the input device 220 includes for example, a volume control knob, the input device 220 receives input regarding desired volume, wherein detected user input requesting an increase in volume may indicate interest and requesting a decrease in volume may indicate disinterest.

In some embodiments, in addition to collecting viewing metrics based on data received from the input device 220, the first electronic processor 200 is configured to collect viewing metrics such as video frames saved locally on the first user device 120 in response to detected user input, video frames sent from the first user device 120 to another user device in response to detected user input (for example the second user device 125), and a calculated time of accessing each video frame by the user.

At block 410, the electronic computing device 110 receives viewing metrics, such as those set forth above, generated for the first video indicative of levels of viewing interest in portions of the first video from the first group pf user devices 140. The electronic computing device 110 may also receive viewing metrics from a plurality of other groups of user devices associated with other user roles that are different from the user role of the first group of user devices 140 and the user role of the second group of user devices 145. In some embodiments, the electronic computing device 110 also collects its own viewing metrics. For example, the second electronic processor 300 may determine, for each video frame, a number of viewers (users that viewed the video frame) such as the total number of user devices 115 that downloaded or streamed each video or each video frame (block 410). In some embodiments, the viewing metrics include an ID associated with the user device generating the viewing metrics (such as, for example, a network ID, hardware device ID, user ID, and the like). In some embodiments, viewing metrics also include a user role that the user device generating the viewing metrics is associated with. The viewing metrics may be stored in, for example, the memory 305 of the electronic computing device 110. In other embodiments, the electronic computing device 110 receives an ID associated with a user device and a user role associated with the user device separately from viewing metrics. The second electronic processor 300 may map the ID to the user role and stores the ID to role mapping in the second memory 305 of the electronic computing device 110. Subsequently, when the electronic computing device 110 receives viewing metrics including an ID associated with a user device generating the viewing metrics, the second electronic processor 300 determines the user role associated with the user device using the mapping stored in the second memory 305.

The second electronic processor 300 determines, for each of the first video frames, based on the received or determined viewing metrics from block 410 (from the first group of user devices 140), when a level of viewing interest for the first video frame is above a predetermined threshold. In one implementation, the second electronic processor 300 uses a weighted sum of metrics to determine the video frame interest level ($V_{frame\ interest}$) or level of viewing interest for each frame. A weighted sum suitable for use is as follows: $V_{frame\ interest} = \Sigma(x*\text{video playback metrics}, y*\text{analyzed audio})$, where x and y are weighting factors and where, in some embodiments, x and y may be zero. Video playback metrics include, for example, viewing metrics such as eye-interaction with the first video frames, first video frames played back, first video frames replayed, first video frames paused, first video frames zoomed into or out of, first video frames tagged, circled, or labeled, and the like. Audio analytics include, for example, viewing metrics such as audio from a viewing user, input regarding desired volume, and the like. At block 415, when the level of viewing interest indicated by the viewing metrics for one or more of the plurality of user devices 115 is above a predetermined threshold, the second electronic processor 300 classifies one or more of corresponding the first video frames including, in some embodiments, all of the first video frames of the first video, as one or more frames of interest.

The second electronic processor 300 is configured to generate a first video summary associated with the particular user role that describes the contents of the identified frames of interest (block 420) to user devices associated with the particular user role in the first video and stores the first video summary in, for example, the second memory 305. Alternatively, the second electronic processor 300 is configured to train a role-based neural network model using the identified frames of interest associated with the particular user role (also block 420). In some embodiments, and prior to block 420, the second electronic processor 300 adds, for each frame of interest, a predetermined number of video frames that are before the frame of interest, a predetermined number of video frames that are after the frame of interest, or both.

It should be noted that, in some embodiments, only a portion of a first video frame, rather than the entire first video frame, is determined to be of interest. In these embodiments, the received viewing metrics may indicate that users associated with the particular user role may be interested in a particular area of the frame. For example, a user associated with fire response personnel may be interested in a portion of a video frame showing an oil leak but uninterested with the rest of the video frame. As set forth earlier, a user role may be provided to the electronic computing device 110 in the viewing metrics, or may be stored locally at the electronic computing device 110 and identified via the ID (identified in the provided viewing metrics) to role mapping stored at the electronic computing device 110.

The second electronic processor 300 may be configured to execute the content analyzer software 315 to generate the first video summary associated with the particular user role. When executing the content analyzer software 315, the second electronic processor 300 may perform image recognition (for example, object recognition, facial recognition, action recognition, hazard recognition, or a combination of the foregoing) on the one or more frames of interest. In one example, the second electronic processor 300 performs object recognition on the one or more frames of interest to detect, for example, a suspicious parcel or a gun. In another example, the second electronic processor 300 performs facial recognition on the one or more frames of interest to detect, for example, a person with a criminal history or emergency response personnel. In yet another example, the second electronic processor 300 performs action recognition on the one or more frames of interest to detect, for example, a vehicle collision. In another example, the second electronic processor 300 performs hazard recognition on the one or more frames of interest to detect, for example, a fire, a flood, or the like. The results of performing image recognition on the one or more frames of interest are used to generate the first video summary and the first video summary may be, for example, a text summary or an aural summary of the contents of the one or more frames of interest. It should be noted that the second electronic processor 300 may be configured to generate multiple video summaries each associated with a same or a different user role and that the video summaries that the second electronic processor 300 generates may be stored in a video repository included in the second memory 305.

As an alternative to generating a first video summary, the second electronic processor 300 may train a role-based neural network model to determine frames that are of interest to user devices associated with the particular user role using the one or more frames of interest. A role-based neural network model may be trained for each user role of a plurality of user roles and each role-based neural network model is trained using the one or more frames of interest or portions of frames of interest associated with a single user role. For example, a first role-based neural network model may be trained to determine frames of interest to police officers using frames of interest that have been determined to be of interest to police offices based on viewing metrics received from user devices associated with the role of police officer. In another example, a second role-based neural network model is trained to determine frames of interest to firefighters using frames of interest that have been determined to be of interest to firefighters based on viewing metrics received from user devices associated with the role of firefighter.

Figure 5:
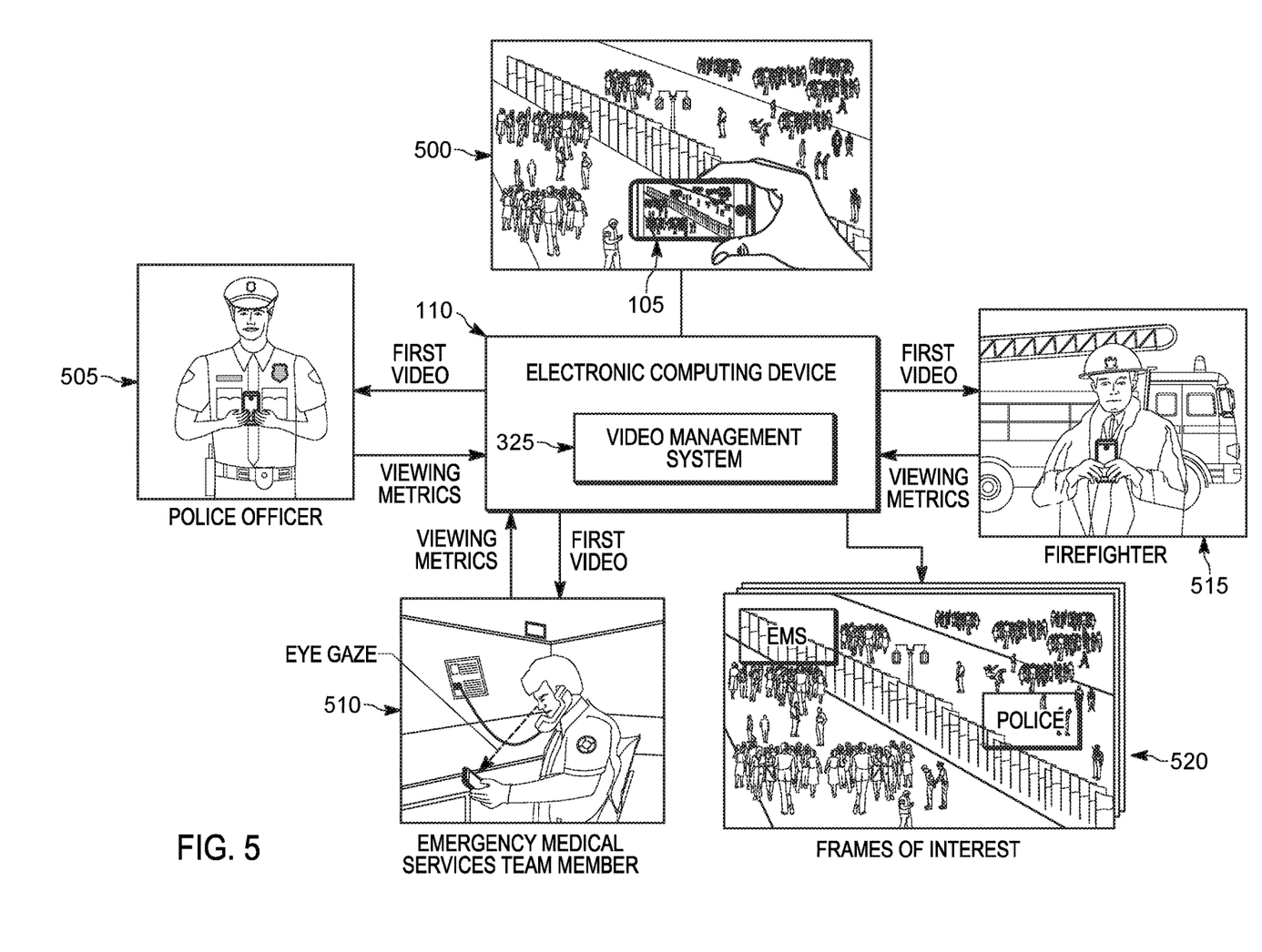
FIG. 5 illustrates an example of collecting viewing metrics for a video to generate a video summary or train a role-based machine learning model for a video.

FIG. 5 illustrates an example of collecting viewing metrics for a video to generate a video summary or train a role-based machine learning model for a video. Image 500 illustrates a video being captured by a camera (for example, the camera 105). In the image 500, the camera 105 is illustrated as being included in a smart phone. In the example illustrated in FIG. 5, the video captured by the camera 105 is transmitted to a video management system (for example, the video management system 325 of the electronic computing device 110). The video management system 325 may transmit the video to a plurality of user devices, each associated with a user role. For example, FIG. 5 illustrates a user device associated with a police officer 505, a user device associated with an emergency medical services (EMS) team member 510, and a user device associated with a firefighter 515. The electronic computing device 110 receives viewing metrics (for example, the viewing metrics described above) from each user device that the video is viewed with. The viewing metrics are used by the electronic computing device 110 to identify one or more frames of interest 520. In some embodiments, the one or more frames of interest 520 may be used to create a video summary. For example, the second electronic processor 300 may analyze the frames of interest 520 along with the portions of the frames of interest 520 that are associated with the user role of firefighter to generate a video summary associated with the user role of firefighter. The video summary associated with the user role of firefighter may be used to identify frames of interest to a firefighter in a video that has not yet been viewed by a firefighter. In some embodiments, the one or more frames of interest are used to train a role-based neural network model. For example, the second electronic processor 300 may train the role-based neural network model using frames of interest 520 along with portions of the frames of interest 520 that are associated with the user role of police officer. Once trained, the role-based neural network model associated with the user role of police officer may be used to identify frames of interest to a police officer in a video that has not yet been viewed by a police officer.

Figure 6:
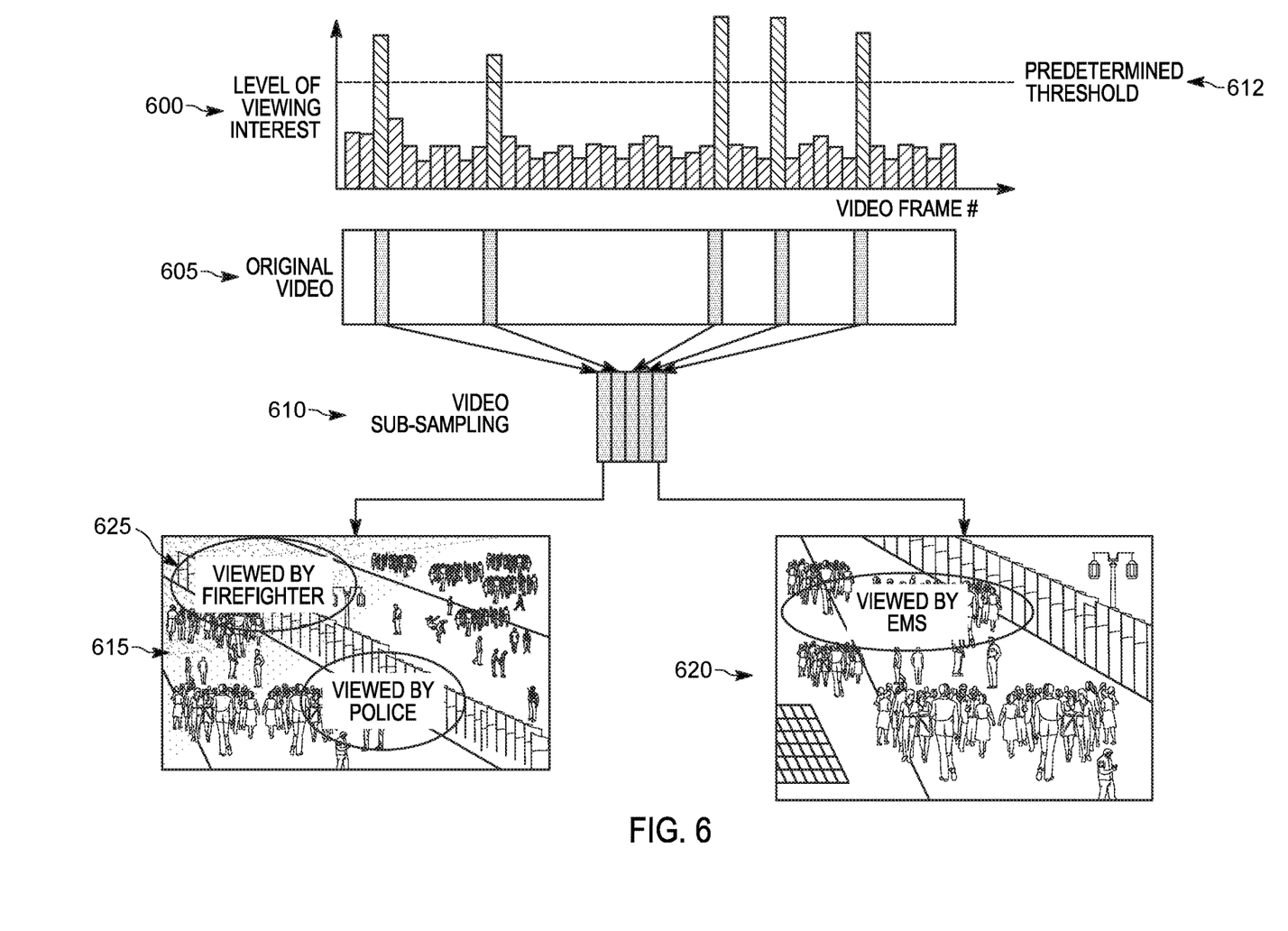
FIG. 6 is a graphical representation of identifying viewing metrics and, in some embodiments, creating a video sub-sampling 610 for training role-based machine learning models according to some embodiments.

FIG. 6 is a graphical representation of identifying viewing metrics and, in some embodiments, creating a video sub-sampling 610 for training role-based machine learning models according to some embodiments. The bar graph 600 illustrates the level of viewing interest determined for each video frame, as described above in the method 400. Each bar in the bar graph 600 represents a frame included in an original video 605 and the height of each bar represents the determined level of viewing interest for that frame. In the example illustrated in FIG. 6, the level of viewing interest is shown to be above a predetermined threshold 612 as determined by the viewing metrics. These five frames from the original video 605 are added to a video sub-sampling 610. A first frame 615 and a second frame 620 are examples of frames that may be included in the video sub-sampling 610. As illustrated by the first frame 615 and the second frame 620, the video sub-sampling 610 includes frames that are of interest to at least one group of user devices associated with a user role. For example, the first frame 615 is determined to be of interest to both a group of user devices associated with the user role of firefighter and a group of user devices associated with the user role of police officer, while the second frame 620 is of interest to a group of user devices associated with the role of emergency response services team member. The first frame 615 and the second frame 620 also illustrate that only a portion of a video frame may be of interest to a group of user devices. For example, an area 625 of the first frame 615 that includes smoke may be the only area of the first frame 615 that is of interest to a group of user devices associated with the user role of firefighter.

In some embodiments, the second electronic processor 300 provides the machine learning software 320 with the video sub-sampling 610 including indications of which portions of video sub-sampling 610 are associated with which user roles. When, in some embodiments, the video sub-sampling 610 is used to train a role-based neural network model, only frames of interest or portions of frames of interest of the video sub-sampling 610 that are associated with the same user role as the user role associated with the role-based neural network model being trained are used to train the role-based neural network model. For example, frames or portions of frames included in the video sub-sampling 610 that are associated with the user role of firefighter are used to train the role-based neural network associated with the user role of firefighter.

At block 425, the second electronic processor 300 receives a second video. The second video may be received from the camera 105. When the second electronic processor 300 receives the second video, the second video has not been viewed by at least the user devices associated with the particular user role and the second electronic processor 300 has not yet received viewing metrics for the second video from the user devices associated with the particular user role.

When, at block 420, the second electronic processor 300 generates a first video summary associated with the particular user role describing contents of the one or more frames of interest, then at block 430 the second electronic processor 300 determines that video content of the second video is of interest to a second group of user devices having the particular user role, by matching portions of the role-based first video summary with portions of a generated second video summary describing contents of the second video. The second electronic processor 300 may be configured to execute the content analyzer software 315 to perform image recognition (for example, object recognition, facial recognition, action recognition, hazard recognition, or a combination of the foregoing) on the one or more frames of the second video to generate the second video summary. When the first video summary and the second video summary are text summaries, the matching the second electronic processor 300 performs may be a word matching process. For example, if both a portion of the first video summary and a portion of the second video summary include the word "fire", the second electronic processor 300 matches those portions. When the first video summary and the second video summary are aural summaries, the matching the second electronic processor 300 performs may be audio segment matching process. In some embodiments, the second electronic processor 300 is configured to match portions of a generated second video summary describing contents of the second video with portions of other video summaries that are associated with the same user role as the first video summary.

When, at block 420, the second electronic processor 300 trains a role-based neural network model associated with the particular user role using the one or more frames of interest, then at block 430 the second electronic processor 300 determines that video content of the second video is of interest to a second group of user devices having the particular user role by providing the second video to the machine learning software 320 (which has access to the role-based neural network model) and finding a match.

In some embodiments, in response to matching content in the second video summary to content in the first video summary or determining a match in the second video using the role-based neural network model, the second electronic processor 300 generates a second video sub-sampling that includes all frames included in the second video matched using the first video summary or the role-based neural network model.

At block 435, and in response to finding a match to content of the first video summary or finding a match with the role-based neural network at block 430 above, the second electronic processor 300 provides one or more of an alert, the second video, the second video summary, and the second video sub-sampling to each user device of the second group of user devices 145. It should be noted that the user devices of the second group of user devices 145 are associated with the same user role that is associated with the first video summary or role-based neural network used to determine a match. The alert notifies a user that the electronic computing device 110 has received video that may be of interest to the user. The alert may be audial, visual, or both. A visual alert may include, for example, links to the second video, the second video summary, the second video sub-sampling, and the like. It should be noted that while the alert is described above as being sent to each user device of the second group of user devices 145, an alert may also be sent to each user device of the first group of user devices 140 when the user devices of the first group of user devices 140 are associated with the same user role (a particular user role) that is associated with the first video summary or role-based neural network used to determine a match.

Figure 7:
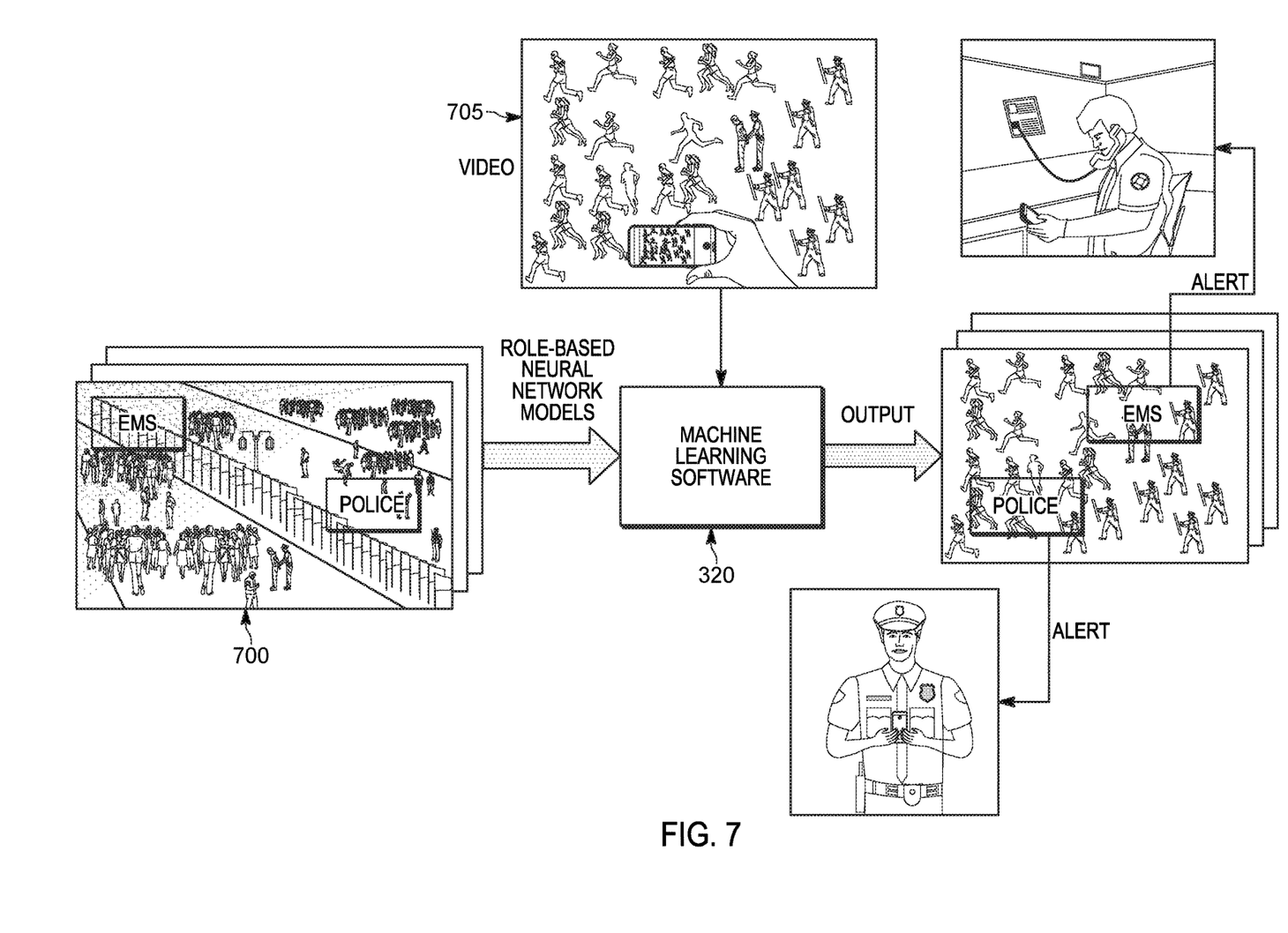
FIG. 7 illustrates an example of providing an alert to a group of user devices based on role using a trained neural network model.

FIG. 7 illustrates an example of providing an alert to a group of user devices based on role using a trained neural network model. As mentioned earlier, and in some embodiments, a video summary word or audio match process is used in place of the machine learning software 320.

In the example shown, role-based trained neural network models 700 are accessed by the machine learning software 320. When a video 705 for which there are no viewing metrics is received (and, for example, has not yet been provided to user devices), the machine learning software 320 may match portions of the video 705 to the trained models 700 to determine the portions of the video 705 that are of interest to one or more groups of user devices based on role. When a particular trained model associated with a particular user role finds a match on a particular frame or portion of a frame of the video 705, that frame or portion of the frame is marked as a frame of interest to groups having the user role of the particular matching network model 700.

Based on the portions of the video 705 that are of interest to one or more groups of user devices having the particular user role, an alert (among other possibilities as mentioned above) is sent to the one or more groups of user devices having that particular role.

In the example illustrated in FIG. 7, the trained models 700 include a trained model associated with the user role of emergency response personnel team member and a trained model associated with the user role of police officer. The machine learning software 320 accesses the trained model associated with the user role of police officer to determine portions of the video 705 of interest to the groups of user devices associated with the user role of police officer. When at least one portion of the video 705 is determined to be of interest to the groups of user devices associated with the user role of police officer, an alert that, for example, identifies the one or more portions of the video 705 that the groups of user devices associated with the user role of police officer may be interested in, is sent to the groups of user devices associated with the user role of police officer.

It should be noted that in some implementations, the embodiments described above utilize image recognition software to generate text summaries of the portions of the first video summary that are of interest to, for example, the particular user role. A text summary is a textual description of the contents of a video frame. The text summaries may be provided to the machine learning software 320. In these embodiments, a text summary for each frame in the second video is generated and the machine learning software 320 determines text summaries of the second video associated with the particular user role.

It should also be noted that the role-based neural network models accessed by the machine learning software 320 may learn continuously. For example, the machine learning software 320 may be provided with indications of which portions of the second video are associated with which user roles of the plurality of possible user roles (for example, an indication of the portion of the second video summary that is associated with the particular user role), based on viewing metrics associated with the second video, second video summary, sub-sampling of the second video, or a combination of the foregoing. The second electronic processor 300 trains the role-based neural network models using the viewing metrics associated with the second video, second video summary, sub-sampling of the second video, or a combination of the foregoing.

It should also be noted that the first video summary may be included in a video summary repository. The video summary repository may be continuously updated. For example, a video summary of frames (included in the second video) of interest to user devices associated with the particular user role may be created based on viewing metrics associated with the second video, second video summary, sub-sampling of the second video, or a combination of the foregoing. This video summary may and added to the video summary repository that includes the first video summary.

It should also be noted that the second electronic processor 300 may be configured to detect pre-events that indicate that a public safety event will occur and notify an interested group of user devices of the pre-event. For example, the machine learning software 320 may detect an oil spill in a video and send an alert (including, for example, the video including the oil spill) to fire response personnel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device for alerting groups of user devices to similar video content of interest based on role, the electronic computing device comprising:
   an electronic processor, the electronic processor configured to
      provide, to a plurality of groups of user devices, each group having an associated user role selected from a plurality of possible user roles, a first video that includes first video frames;
      receive viewing metrics generated for the first video indicative of levels of viewing interest in portions of the first video from a first group of user devices associated with a particular user role;
      when a level of viewing interest indicated by the viewing metrics for one or more of the user devices in the first group is above a predetermined threshold, classify one or more corresponding first video frames of the first video as one or more frames of interest;
      perform at least one selected from the group consisting of generate a first video summary associated with the particular user role describing contents of the one or more frames of interest and train a role-based neural network model associated with the particular user role using the one or more frames of interest;
      receive a second video;
      determine, by at least one selected from the group consisting of (i) matching portions of the role-based first video summary with portions of a generated second video summary describing contents of the second video and (ii) providing the second video to a machine learning software having access to the role-based neural network model and finding a match, that video content of the second video is of interest to a second group of user devices having the particular user role; and
      provide one or more of an alert, the second video, the second video summary, and a sub-sampling of the second video corresponding to portions of the second video matching at least one selected from the group consisting of the first video summary and the role-based neural network model to the second group of user devices.

2. The electronic computing device according to claim 1, wherein the electronic processor is further configured to determine that video content of the second video is of interest to the second group of user devices having the particular user role, by matching portions of the role-based first video summary with portions of the generated second video summary describing contents of the second video when the electronic processor generates the first video summary associated with the particular user role describing contents of the one or more frames of interest.

3. The electronic computing device according to claim 1, wherein the electronic processor is further configured to
   receive viewing metrics generated for the second video indicative of levels of viewing interest in portions of the second video of one or more user devices of the second group of user devices; and
   use the viewing metrics generated for the second video summary to train the role-based neural network model.

4. The electronic computing device according to claim 2, wherein the electronic processor is further configured to determine that video content of the second video is of interest to the second group of user devices having the particular user role, by providing the second video to a machine learning software having access to the role-based neural network model and finding a match when the electronic processor trains the role-based neural network model associated with the particular user role using the one or more frames of interest.

5. The electronic computing device according to claim 1, wherein the electronic processor is configured to generate a first video summary describing contents of the one or more frames of interest by performing object recognition, facial recognition, action recognition, hazard recognition, or a combination of the foregoing.

6. The electronic computing device according to claim 1, wherein the electronic processor is further configured to, for each frame of interest, add a predetermined number of first video frames before the frame of interest, a predetermined number of first video frames that are after the frame of interest, or both.

7. The electronic computing device according to claim 1, wherein the viewing metrics include first video frames paused, first video frames played back, first video frames replayed, first video frames zoomed into or out of, eye-interaction with first video frames, first video frames tagged, circled, or labeled via user input, first video frames saved locally, first video frames sent from a first user device to a second user device, a number of viewers for each first video frame, a time of accessing each first video frame, audio from viewers, or a combination of the foregoing.

8. The electronic computing device according to claim 1, wherein the electronic processor is further configured to
   classify portions of one or more corresponding first video frames of the first video as one or more portions of frames of interest; and
   at least one selected from the group consisting of generate the first video summary associated with the particular user role describing contents of the one or more frames of interest along with the one or more portions of frames of interest and train the role-based neural network model associated with the particular user role using the one or more frames of interest along with the one or more portions of frames of interest.

9. The electronic computing device according to claim 1, wherein the first video summary is a text summary or an aural summary describing contents of the one or more frames of interest.

10. A method of alerting groups of user devices to similar video content of interest based on role, the method comprising:
   providing, to a plurality of groups of user devices, each group having an associated user role selected from a plurality of possible user roles, a first video that includes first video frames;
   receiving viewing metrics generated for the first video indicative of levels of viewing interest in portions of the first video from a first group of user devices associated with a particular user role;

when a level of viewing interest indicated by the viewing metrics for one or more of the user devices in the first group is above a predetermined threshold, classifying one or more corresponding first video frames of the first video as one or more frames of interest;

at least one selected from the group consisting of generating a first video summary associated with the particular user role describing contents of the one or more frames of interest and training a role-based neural network model associated with the particular user role using the one or more frames of interest;

receiving a second video;

determining, by at least one selected from the group consisting of (i) matching portions of the role-based first video summary with portions of a generated second video summary describing contents of the second video and (ii) providing the second video to a machine learning software having access to the role-based neural network model and finding a match, that video content of the second video is of interest to a second group of user devices having the particular user role; and providing one or more of an alert, the second video, the second video summary, and a sub-sampling of the second video corresponding to portions of the second video matching at least one selected from the group consisting of the first video summary and the role-based neural network model to the second group of user devices.

11. The method according to claim 10, wherein the method includes determining, by matching portions of the role-based first video summary with portions of a generated second video summary describing contents of the second video, that video content of the second video is of interest to the second group of user devices having the particular user role when the method includes generating a first video summary associated with the particular user role describing contents of the one or more frames of interest.

12. The method according to claim 10, the method further comprising receiving, with the electronic computing device, viewing metrics generated for the second video indicative of levels of viewing interest in portions of the second video of one or more user devices of the second group of user devices; and using the viewing metrics generated for the second video summary to train the role-based neural network model.

13. The method according to claim 10, wherein the method includes determining that video content of the second video is of interest to the second group of user devices having the particular user role, by providing the second video to a machine learning software having access to the role-based neural network model and finding a match when the method includes training the role-based neural network model associated with the particular user role using the one or more frames of interest.

14. The method according to claim 10, wherein generating a first video summary describing contents of the one or more frames of interest includes by performing object recognition, facial recognition, action recognition, hazard recognition, or a combination of the foregoing.

15. The method according to claim 10, wherein the viewing metrics include first video frames paused, first video frames played back, first video frames replayed, first video frames zoomed into or out of, eye-interaction with first video frames, first video frames tagged, circled, or labeled via user input, first video frames saved locally, first video frames sent from a first user device to a second user device, a number of viewers for each first video frame, a time of accessing each first video frame, audio from viewers, or a combination of the foregoing.

16. The method according to claim 10, wherein a user role included in the plurality of possible user roles is a user role associated with emergency response personnel.

17. The method according to claim 10, wherein the first group of user devices and the second group of user devices are the same.

18. The method according to claim 10, wherein the first group of user devices and the second group of user devices are different.

19. The method according to claim 10, the method further comprising classifying portions of one or more corresponding first video frames of the first video as one or more frames of interest; and one selected from the group consisting of generating the first video summary associated with the particular user role describing contents of the one or more frames of interest along with the one or more portions of frames of interest and training the role-based neural network model associated with the particular user role using the one or more frames of interest along with the one or more portions of frames of interest.

20. The method according to claim 10, wherein the first video summary is a text summary or an aural summary describing contents of the one or more frames of interest.

* * * * *